US011727348B2

(12) United States Patent
Borjian Boroujeni et al.

(10) Patent No.: US 11,727,348 B2
(45) Date of Patent: Aug. 15, 2023

(54) SYSTEM AND METHOD FOR SELF-TUNING OPTIMIZATION OF AN ITEM REPLENISHMENT POLICY (71) Applicant: ORACLE INTERNATIONAL CORPORATION, Redwood Shores, CA (US)

(72) Inventors: Setareh Borjian Boroujeni, Princeton, NJ (US); Su-Ming Wu, Waltham, MA (US)

(73) Assignee: Oracle International Corporation, Redwood Shores, CA (US)

( * ) Notice: Subject to any disclaimer, the term of this patent is extended or adjusted under 35 U.S.C. 154(b) by 356 days.

(21) Appl. No.: 16/952,468

(22) Filed: Nov. 19, 2020

(65) Prior Publication Data
US 2022/0036289 A1 Feb. 3, 2022

Related U.S. Application Data (60) Provisional application No. 63/058,851, filed on Jul. 30, 2020.

(51) Int. Cl.
*G06Q 10/087* (2023.01)
*G06Q 10/10* (2023.01)
(Continued)

(52) U.S. Cl.
CPC ....... *G06Q 10/087* (2013.01); *G05B 19/4155* (2013.01); *G06Q 10/04* (2013.01);
(Continued)

(58) Field of Classification Search
None
See application file for complete search history.

(56) References Cited

U.S. PATENT DOCUMENTS 10,977,609 B1* 4/2021 Adulyasak ......... G06Q 30/0202
2003/0216831 A1* 11/2003 Hart ..................... G16H 15/00
700/235
(Continued)

FOREIGN PATENT DOCUMENTS

CA 3 049 022 A1 7/2018

OTHER PUBLICATIONS

Jiang, Chengzhi, and Zhaohan Sheng. "Case-based reinforcement learning for dynamic inventory control in a multi-agent supply-chain system." Expert Systems with Applications 36.3 (2009): 6520-6526 (Year: 2009).*

(Continued)

Primary Examiner — Darlene Garcia-Guerra
(74) Attorney, Agent, or Firm — Kraguljac Law Group, LLC (57) ABSTRACT

Systems, methods, and other embodiments associated with self-tuning optimization of a replenishment policy of an item are described. In one embodiment, the method includes determining an initial replenishment policy of the item. A performance of the initial replenishment policy is determined based upon past performance of the initial replenishment policy. The initial replenishment policy is revised to get a service level of the item for future sales periods closer to a target service level of the item. Information is forwarded in real-time about the revised replenishment policy to an order fulfillment facility.

18 Claims, 9 Drawing Sheets

(51) Int. Cl.
*G06Q 10/04* (2023.01)
*G06Q 30/0201* (2023.01)
*G06Q 10/083* (2023.01)
*G06Q 10/0639* (2023.01)
*G05B 19/4155* (2006.01)
*G06Q 10/0631* (2023.01)

(52) U.S. Cl.
CPC . *G06Q 10/06315* (2013.01); *G06Q 10/06393* (2013.01); *G06Q 10/083* (2013.01); *G06Q 10/10* (2013.01); *G06Q 30/0201* (2013.01); *G05B 2219/45083* (2013.01)

(56) References Cited

U.S. PATENT DOCUMENTS

| | | | |
|---|---|---|---|
| 2006/0004624 A1* | 1/2006 | Melara | G06Q 10/063 705/7.29 |
| 2009/0240544 A1* | 9/2009 | Cheng | G06Q 10/0631 705/7.12 |
| 2015/0032512 A1* | 1/2015 | Bateni | G06Q 30/0206 705/7.35 |
| 2018/0150793 A1* | 5/2018 | Lert, Jr. | G06Q 10/0833 |
| 2018/0194556 A1 | 7/2018 | Lert, Jr. et al. | |
| 2019/0026770 A1* | 1/2019 | Murugesan | G06Q 30/0641 |
| 2020/0126015 A1* | 4/2020 | Anandan Kartha | G06Q 10/087 |
| 2020/0184411 A1* | 6/2020 | Shah | G05D 1/0274 |
| 2021/0221619 A1 | 7/2021 | Lert, Jr. et al. | |

OTHER PUBLICATIONS

Duan, Qinglin, and T. Warren Liao. "Anew age-based replenishment policy for supply chain inventory optimization of highly perishable products." International journal of production economics 145.2 (2013): 658-671 (Year: 2013).*

Patent Cooperation Treaty (PCT), PCT International Search Report and Written Opinion issued in PCT International Application No. PCT/US2021/043388 (International Filing Date Jul. 28, 2021 ) dated Nov. 8, 2021 (12 pgs).

* cited by examiner

SYSTEM AND METHOD FOR SELF-TUNING OPTIMIZATION OF AN ITEM REPLENISHMENT POLICY

CROSS-REFERENCE TO RELATED APPLICATIONS

This disclosure claims the benefit of U.S. Provisional Patent Application Ser. No. 63/058,851, filed on Jul. 30, 2020, titled "Self-tuning Optimization of Replenishment Policy in Retail Inventory Management", and assigned to the present assignee, the disclosure of which is hereby incorporated by reference in its entirety.

BACKGROUND

Figure 1:
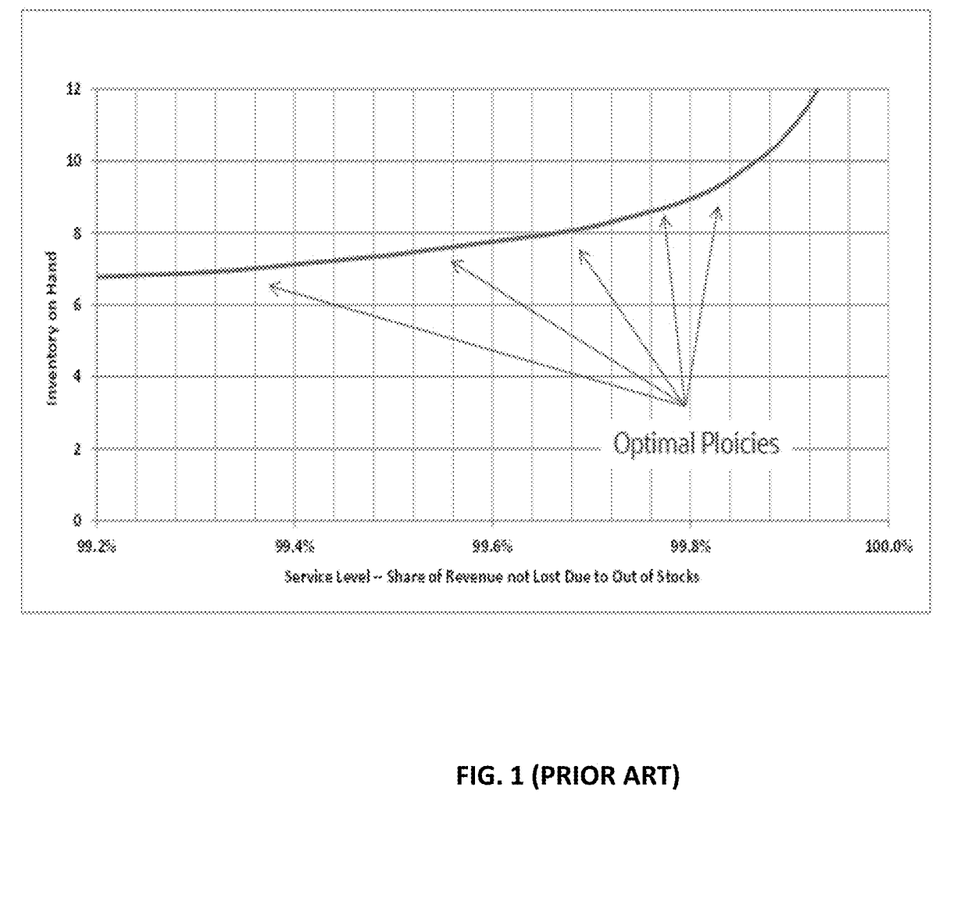
FIG. 1 is a graphical illustration of an example of the trade-off between service level (which is one minus stock-out rate) and average daily inventory on-hand.

Replenishment optimization is a key part of day-to-day operations for inventory systems. This process determines the optimal answer to two questions: when to replenish an item (re-order point) and how much to order (receive-up-to-level). These two parameters are often referred to as "replenishment policy." The goal for these systems is to keep the stock-out rate below a certain threshold with minimum on-hand inventory, or to keep the on-hand inventory below a certain threshold with a minimum stock-out rate. Consequently, an optimal replenishment policy is the one that provides the optimal trade-off between stock-out rate and on-hand inventory. FIG. 1 shows an example of the trade-off between service level (which is one minus stock-out rate) and average daily inventory on-hand.

There are two broad categories of replenishment policies: 1) static (a.k.a. min/max policy) and 2) forecast-based.

In a min/max policy, it is assumed that re-order point (a.k.a. min) and receive-up-to-level (a.k.a. max) take fixed values, and the goal is to find the optimal values for these two parameters given different factors like demand patterns, lead time (the time it takes from placing an order to receiving and order), and review time (the time between inventory review periods). For example, a policy with re-order point of 5 units and receive-up-to-level of 10 units means that the retailer would place an order to bring the inventory level up to 10 units if the on-hand quantity is less than or equal to 5 units at the time that the inventory is being reviewed. The inventory is typically reviewed and decisions about replenishment are made based on a review schedule, for example, daily, weekly, or on certain days of the week.

In the forecast-based method, the re-order point and receive-up-to-level are calculated based on the forecast of demand over the period of lead time plus review time, as well as a safety stock. Safety stock is an additional quantity that is kept on hand to reduce the risk of stock out. To calculate the safety stock using a closed form expression, it is assumed that demand follows a certain distribution (Normal is the most common. Poisson is used for items with low rate of sales).

Traditionally, the optimal replenishment policies are determined through extensive simulation on historical sales and inventory data. The simulation approach allows for evaluating several different policies (i.e., re-order point and receive-up-to-level) under various demand scenarios, which are generated based on the historical data. From the pool of simulated policies, the ones that provide an optimal trade-off between stock-out rate and on-hand inventory are selected. This approach requires careful setup of demand scenarios and replenishment parameters by an analyst, and it is necessary to simulate numerous scenarios for thousands of items and locations to get statistically reliable results. Moreover, the simulation approach is suitable only when future demand patterns are expected to be similar to the historical demand.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Systems and methods are described herein that implement a 'self-tuning' replenishment optimization method that is used in an inventory optimization (IO) product. The self-tuning method that is described herein replaces large scale simulations of thousands of item-locations, which is the typical way for determining optimal replenishment policies. As a result, the 'self-tuning' replenishment optimization method provides significant savings in hardware cost and reductions of computation time (less computing resource usage). Thus, these are both improvements to previous hardware systems as achieved by the present system and method, which amount to a practical application. Moreover, the 'self-tuning' replenishment optimization method offers more accurate policies when there are uncertainties such as during a pandemic where there is more uncertainty with respect to demand and supply, or for new items (in fashion and hardline) where demand patterns cannot be predicted accurately and there is no historical data. For at least these reasons, the present system and method implement a practical application for these technical techniques.

In one embodiment, the present system is self-tuning for forecast-based replenishment policies, but a similar technique may be applied to min/max replenishment policies. Also, the present system is able to react to irregular patterns and uncertainties (e.g., shifts in demand, stockpiling, and longer supply lead time during a pandemic). Finally, the present system is also significantly more scalable and efficient compared to the traditional methods of replenishment optimization which are also practical applications.

As discussed above, the ultimate goal for retailers is to keep the stock-out rate below a certain threshold with minimum on hand inventory. Towards this end, in one embodiment, the Inventory Optimization (IO) determines the optimal decisions for when to replenish an item (re-order point), what inventory level to keep on hand for each item (receive-up-to-level), and how to move inventory between stores in order to avoid mark down of slow selling items which is another practical application.

The present self-tuning replenishment optimization in IO initializes the replenishment process using a simple replenishment policy (which may not necessarily be optimal), based on historical or forecast demand. Using the daily collected data of stock-out rate, on hand inventory and back-cast error, the replenishment parameters are dynamically tuned to adapt to the observed metrics as well as the unpredicted changes in demand patterns or supply chain. The self-tuning method eliminates the need for setting up and running large scale simulations and is more accurate under uncertain circumstances because it is able to adapt to changes on the demand and supply side which is another practical application. Finally, this method is also more efficient from a user standpoint since the tuning is an automated process which is data driven and is triggered by calculated metrics which is another practical application.

The self-tuning optimization method consists of three main steps: 1) initialization, 2) calculation of metrics, 3) tuning of parameters.

As discussed above, the replenishment process is initialized using a simple replenishment policy (which may not necessarily be optimal), based on historical or forecast demand and other factors like lead time and review schedule. In each period (e.g., each day), performance metrics like stock-out rate, on hand inventory, and back-cast error are calculated based on the data up to that point. Then the replenishment policy parameters are adjusted to bring the stock-out rate and/or average on hand inventory closer to the target level.

The self-tuning method can be applied to min/max or forecast-based policies. It is to be understood that the scope of the present invention is self-tuning for forecast-based replenishment policies. However, a similar scheme can be applied to min/max policy, but it is not being covered in the present invention. The three steps are explained below.

Figure 2:
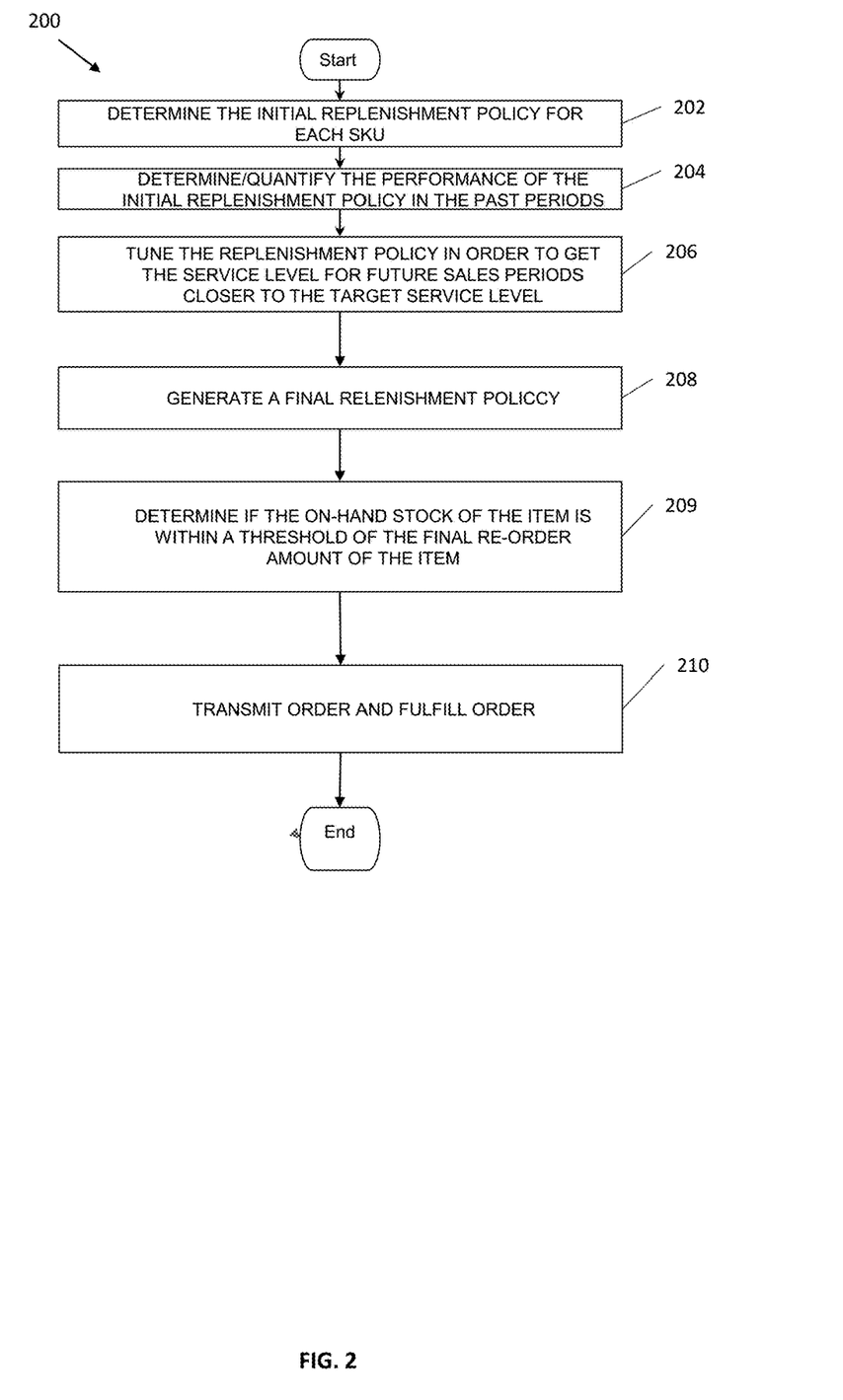
FIG. 2 illustrates one embodiment of a 'self-tuning' replenishment optimization method that is used in an inventory optimization (IO) product.

With reference to FIG. 2, a computer-implemented method 200 is illustrated that describes one embodiment for a 'self-tuning' replenishment optimization method that is used in an inventory optimization (IO) product. The method 200 is performed by at least a processor of a computer system that accesses and interacts with memories and/or data storage devices. For example, the processor at least accesses and reads/writes data to the memory and processes network communications to perform the actions of FIG. 2.

Initialization

With continued reference to FIG. 2, at 202, the method 200 is initiated when the System Administrator sets the initial replenishment policy (the reorder point and receive-up-to-level) for each stock keeping unit (hereinafter "SKU") in a store (hereinafter "SKU-store"). These initial values will be used by the inventory management and order fulfillment systems when the replenishment optimization system is first implemented, i.e., before the self-tuning aspect of the process begins.

Figure 3:
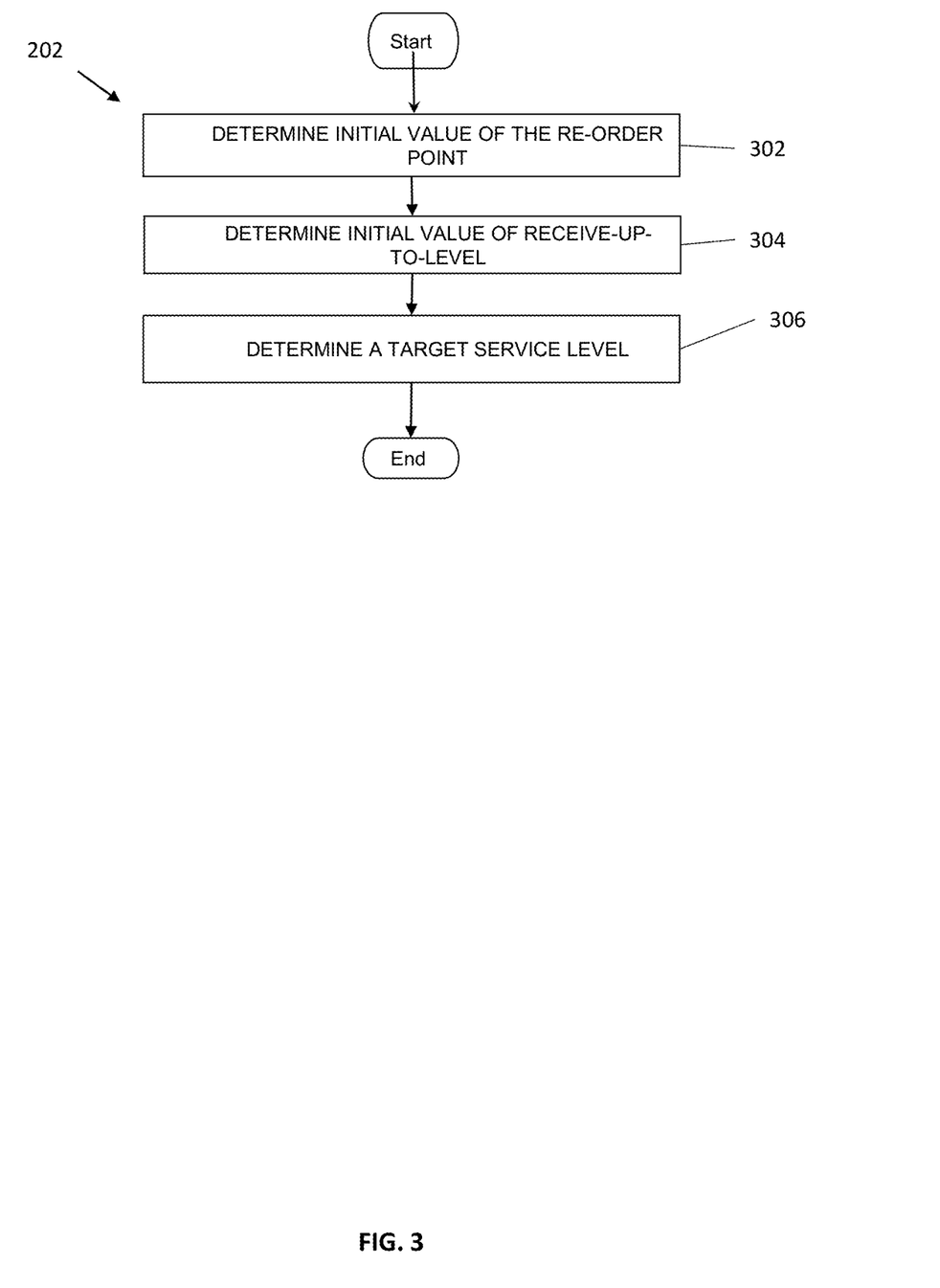
FIG. 3 illustrates one embodiment for a method for the determination of the initial replenishment policy (the reorder point and receive-up-to-level) for each stock keeping unit.

With respect to the determination of the initial replenishment policy (the reorder point and receive-up-to-level) for each stock keeping unit, attention is directed to FIG. 3. As shown in FIG. 3, the initial values for step 202 (FIG. 2) of re-order point (step 302), receive-up-to-level (step 304), and a target service level of the item (step 306) are determined. However, the initial values of re-order point (step 302) and receive-up-to-level (step 304) are calculated differently in the case of min/max vs forecast-based.

For a forecast-based policy, there is a closed form expression that is used in practice. For example, assuming Normal distribution for the demand over lead time and review time, the re-order point (RP) and receive-up-to-level (RUTL) are calculated as follows:

$$SS = Z * \sigma_{RT+LT}, \text{ where } Z = L^{-1}(W) \text{ and } W = \frac{(1-SL)Fcst_{RT}}{\sigma_{RT+LT}} \quad \text{(Eq. 1)}$$

$$RP = Fcst_{LT} + Fcst_{RT} + SS \quad \text{(Eq. 2)}$$

$$RUTL = Fcst_{LT} + Fcst_{ISD} + SS \quad \text{(Eq. 3)}$$

SS is the safety stock. $\sigma_{RT+LT}$ is the standard deviation of demand over the period of lead time plus review time. SL is the target service level. For example, a service level of 95% indicates that it is desired to keep the stock-out rate below 5%. $L^{-1}(W)$ is the inverse of the standard loss function (the values of Z and L(Z) are calculated based upon numerical integration. These values are usually stored in a look up table which is used when calculating the safety stock). $Fcst_{ISD}$ is the demand forecast over the period of inventory selling days which is the number of days the item is expected to be in stock.

All of the above information is required for each of the tens of thousands of SKU items in a store and is stored in database tables that are indexed by SKU-store. A forecast for each SKU-store is also stored in a database table, by SKU-store. The lookup table for the function $L^{-1}$ is also in a database table. The SQL queries are then used to calculate the above quantities for each SKU-store. Since the data is stored in database tables, SQL is a necessary tool for performing these calculations.

If pre-season (initial) forecast is not available for an item, the initial values can be set based on historical data, as shown below. Alternatively, the user can set these values based on policies that have been used and worked well in the past.

$$RP = \frac{1}{T-LT-RT+1}\left( \sum_{t=1}^{T-LT-RT+1} SLS_{[t,t+LT+RT-1]} + LS_{[t,t+LT+RT-1]} \right) \quad \text{(Eq. 4)}$$

$$RUTL = \frac{1}{T-LT-ISD+1}\left( \sum_{t=1}^{T-LT-ISD+1} SLS_{[t,t+LT+ISD-1]} + LS_{[t,t+LT+ISD-1]} \right) \quad \text{(Eq. 5)}$$

$SLS_{[t,t+LT+RT-1]}$ is the historical sales over a period of lead time plus review time. This value is calculated for all different periods of lead time plus review time. Then re-order point (RP) is calculated as the average of all of such values. Receive-up-to-level (RUTL) is calculated in a similar way, except that the historical sales over period of lead time plus inventory selling days is taken into account. The second term in both expressions is the estimated lost sales in the corresponding period. If this value is available (for example, provided by a forecast engine), it can be used in the calculation of RP and RUTL. Otherwise, the lost sales term can be ignored. However, ignoring this term might cause the tuning step to take longer to adjust.

Again, because these calculations are performed for each SKU-store, SQL is used to perform them. In particular, the calculation of the $SLS_{[t,t+LT+RT-1]}$ is done with the "analytic SQL" feature of a database system in order to complete the calculations in a reasonable amount of time.

For new items that do not have any historical sales, either use the historical sales of a like-item (with similar attributes) or use the mean daily forecast to calculate RP and RUTL as daily forecast×(LT+RT) and daily forecast×(LT+ISD), respectively.

Calculation of Metrics

Returning back to FIG. 2, in 204, the goal of this step is to determine (or quantify) the performance of the initial replenishment policy in the past periods. The main metric that is calculated in this step is the stock-out rate. This value will be used to determine if further tuning of the replenishment policy is necessary.

The following metrics are calculated in each period (e.g., daily). The value of these metrics determines if and how the re-order point and receive-up-to-level should be tuned.

Figure 4:
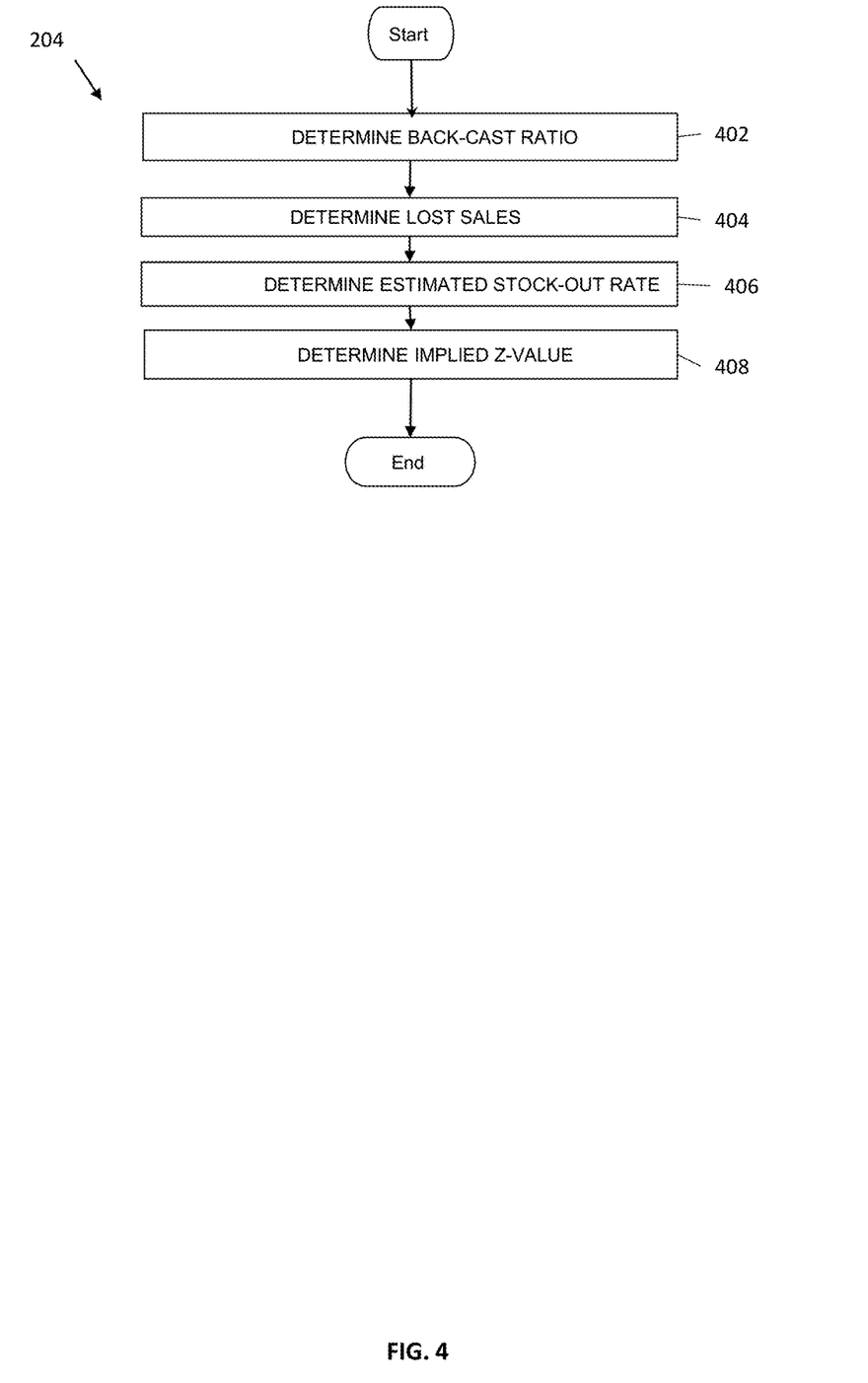
FIG. 4 illustrates one embodiment for a method for the quantification of the performance of the replenishment policy in the past periods.

With respect to the quantification of the performance of the replenishment policy in the past periods (step 204), attention is directed to FIG. 4. As shown in FIG. 4, in 402, the back-cast ratio is determined. The back-cast ratio is the accuracy measure that is calculated based on the forecast of past periods and the weighted average of forecast and observed sales of past periods. Only the periods with no stock-out are considered. Using a weighted average of forecast and sales rather than the sales itself in the denominator allows for calculating this ratio even when sales are zero. Parameter a should be large enough to give most of the weight to the sales (e.g., value of 0.9 or larger). When both forecast and sales are zero, the ratio is set to 1.

above calculation for all SKU-stores, using the sales data and forecast data stored in the previously-mentioned tables.

In 404, the estimated lost sales are determined. Estimated lost sales are sales for any period with no stock-out (i.e., if end of period inventory is greater than zero) means that the lost sales is zero. For stock-out periods, the lost sales are estimated as follows:

$$LS_t = \begin{cases} \max(\text{adjusted\_fcst}_t - sls_t, 0) & \text{if end of period inventory is 0} \\ 0 & \text{otherwise} \end{cases} \quad \text{(Eq. 7)}$$

$$\text{Where adjusted\_fcst}_t = \frac{fcst_t}{\text{back cast ratio}_t}$$

In 406, the estimated stock-out rate is determined. On any given period, stock-out rate over all past periods is calculated as:

$$SO_t = \frac{\sum_{i=1}^{t} LS_i}{\sum_{i=1}^{t}(sls_i + LS_i)} \quad \text{(Eq. 8)}$$

In 408, the implied Z-value is determined. Given the estimated stock-out rate, it is possible to use the equation (1) above to back-calculate the Z-value that is implied by this stock-out rate.

$$\text{Implied\_W} = \frac{SO_t \times \text{adjusted\_fcst}_{t_{RT}}}{\sigma_{RT+LT}} \quad \text{(Eq. 9)}$$

$$\text{Implied\_Z} = L^{-1}(\text{Implied\_W}) \quad \text{(Eq. 10)}$$

Again, here the SQL code for implementing this uses the pre-calculated lookup table in the database to calculate $L^{-1}(\text{Implied\_W})$.

Tuning

Returning back to FIG. 2, in 206, the goal of this step is to tune the replenishment policy (i.e., the reorder point and receive-up-to-level) in order to get the service level for $$\text{back cast ratio}_t = \begin{cases} 1 & \text{if } \sum_{i=1}^{t} fcst_i = \sum_{i=1}^{t} sls_i = 0 \ i \in \{\text{no stockout periods}\} \\ \frac{\sum_{i=1}^{t} fcst_i}{\sum_{i=1}^{t} (\alpha \, sls_i + (1-\alpha) fcst_i)}, & \text{otherwise} \\ i \in \{\text{no stockout periods}\} \end{cases} \quad \text{(Eq. 6)}$$

If for a given period, all past periods had stock-out, the back-cast ratio is set to 1 (this will practically ignore calculating the back-cast ratio, because it is not possible to calculate this value when all periods had stock-out).

Because the back-cast ratio is calculated regularly in one embodiment, as new data and forecasts come in, the calculation of the back-cast ratio may be a batch process that is scripted to occur automatically each night or each week. This batch process executes SQL code which performs the future sales periods closer to the target service level. The performance metrics calculated in the previous step (step 204) determines if and by how much the reorder point and receive-up-to-level should be adjusted.

In this step 206, the re-order point and receive-up-to-level of the previous period are adjusted based on the calculated metrics.

Figure 5:
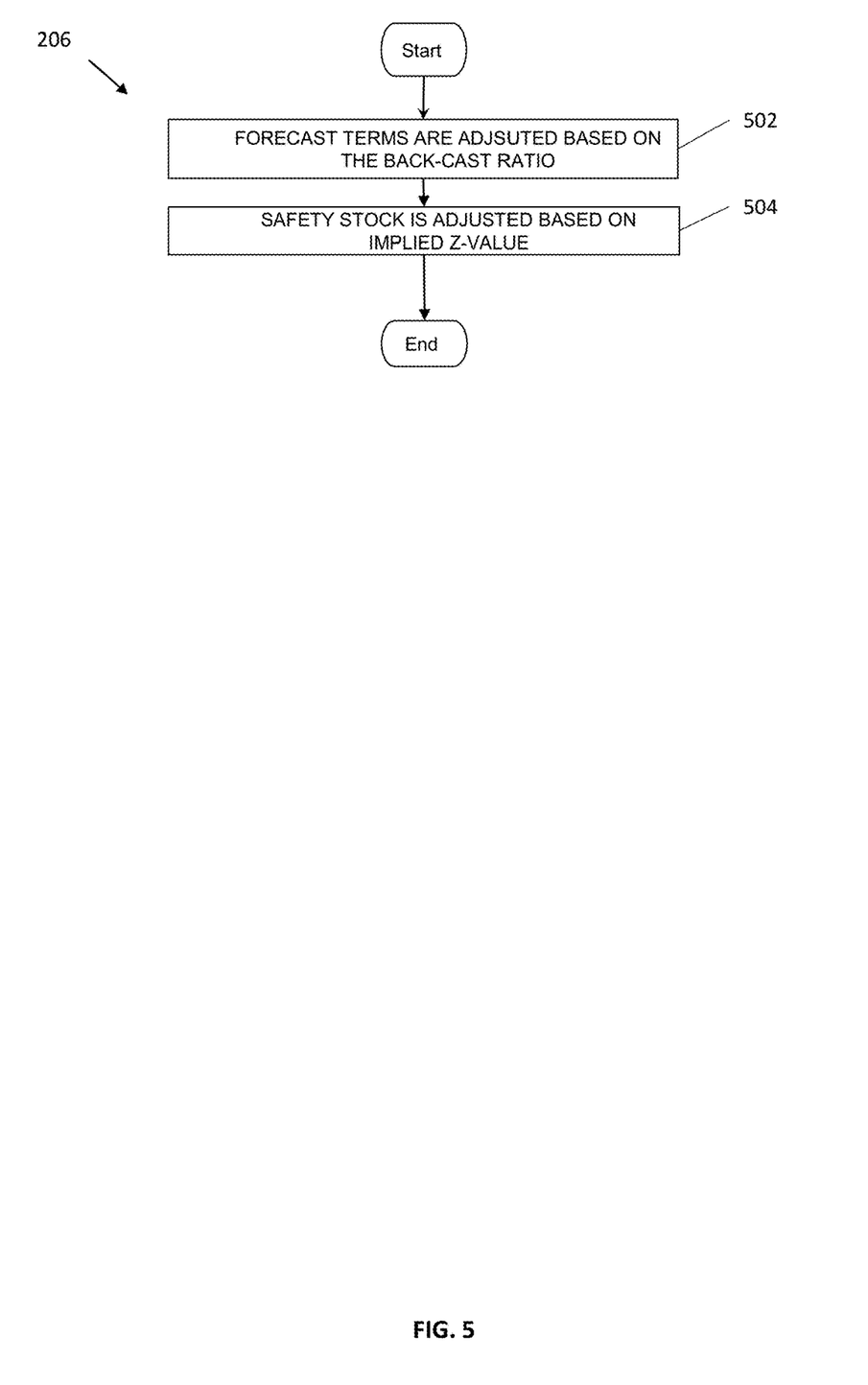
FIG. 5 illustrates one embodiment for a method for the tuning of the replenishment policy (i.e., the reorder point and receive-up-to-level) in order to get the service level for future periods closer to the target service level.

With respect to the tuning of the replenishment policy (i.e., the reorder point and receive-up-to-level) in order to get the service level for future periods closer to the target service level (step 206), attention is directed to FIG. 5. As shown in FIG. 5, in 502, the forecast terms are adjusted based on the back-cast ratio. In 504, the safety stock is adjusted based on implied Z-value.

$$adjusted_{SS} = \frac{Z}{\text{implied\_Z}} \times SS \quad \text{(Eq. 11)}$$

$$RP = \text{adjusted\_Fcst}_{LT} + \text{adjusted\_Fcst}_{RT} + \text{adjusted\_SS} \quad \text{(Eq. 12)}$$

$$RUTL = \text{adjusted\_Fcst}_{LT} + \text{adjusted\_Fcst}_{ISD} + \text{adjusted\_SS} \quad \text{(Eq. 13)}$$

$$\text{Where adjusted\_fcst}_{LT} = \frac{fcst_{LT}}{\text{back cast } ratio_t}.$$

And adjusted forecast for RT and ISD is calculated similarly.

Adjusting the safety stock can be done in different ways. For example $$\log\left(\frac{Z}{implied_Z}\right)$$

can be used for a more moderate adjustment of safety stock.

Returning to FIG. 2, once the replenishment policy has been tuned (i.e., the reorder point and receive-up-to-level have been adjusted) to get the service level for future sales periods closer to the target service level, in 208, a final replenishment policy is generated in real-time. The final replenishment policy includes a final service level data structure that further includes a final reorder point and a final receive-up-to-level.

In 208, for example, if and when it is determined by the system that the final reorder point has been adjusted from five (5) units to six (6) units and the final receive-up-to-level has been adjusted from ten (10) units to 12 units for a particular store, a final replenishment policy for that particular store will be generated by the system. The final replenishment policy will include a final data structure that shows that the final reorder point is now six (6) units and the final receive-up-to-level is now 12. In this manner, in 209, if and when it is later determined by the system that the inventory of the item has fallen below 6 (e.g., the current inventory or on-hand stock of the item at the particular store is now 4), the system will detect that the reorder point threshold has been exceeded at that particular store and an order will be sent by the system to the fulfillment center such as a warehouse or a manufacturing facility. The order will request that the fulfillment center ship eight (8) of the items to the particular store so that the store's stock returns to 12 units.

In 210, as discussed in more detail below, an order is transmitted to an item fulfillment facility so that the item fulfillment facility has access to up-to-date information about the final item replenishment policy and the item fulfillment facility can fulfill the order. In particular, the order refers to the request that is sent by the system to the fulfillment center to request that the fulfillment center ship a certain number of units of the item to a particular store so that the store's final reorder point and the final receive-up-to-level for the item are returned to their desired final reorder point and final receive-up-to-level.

Interactions of the System with Order Management and Execution Systems

Figure 6:
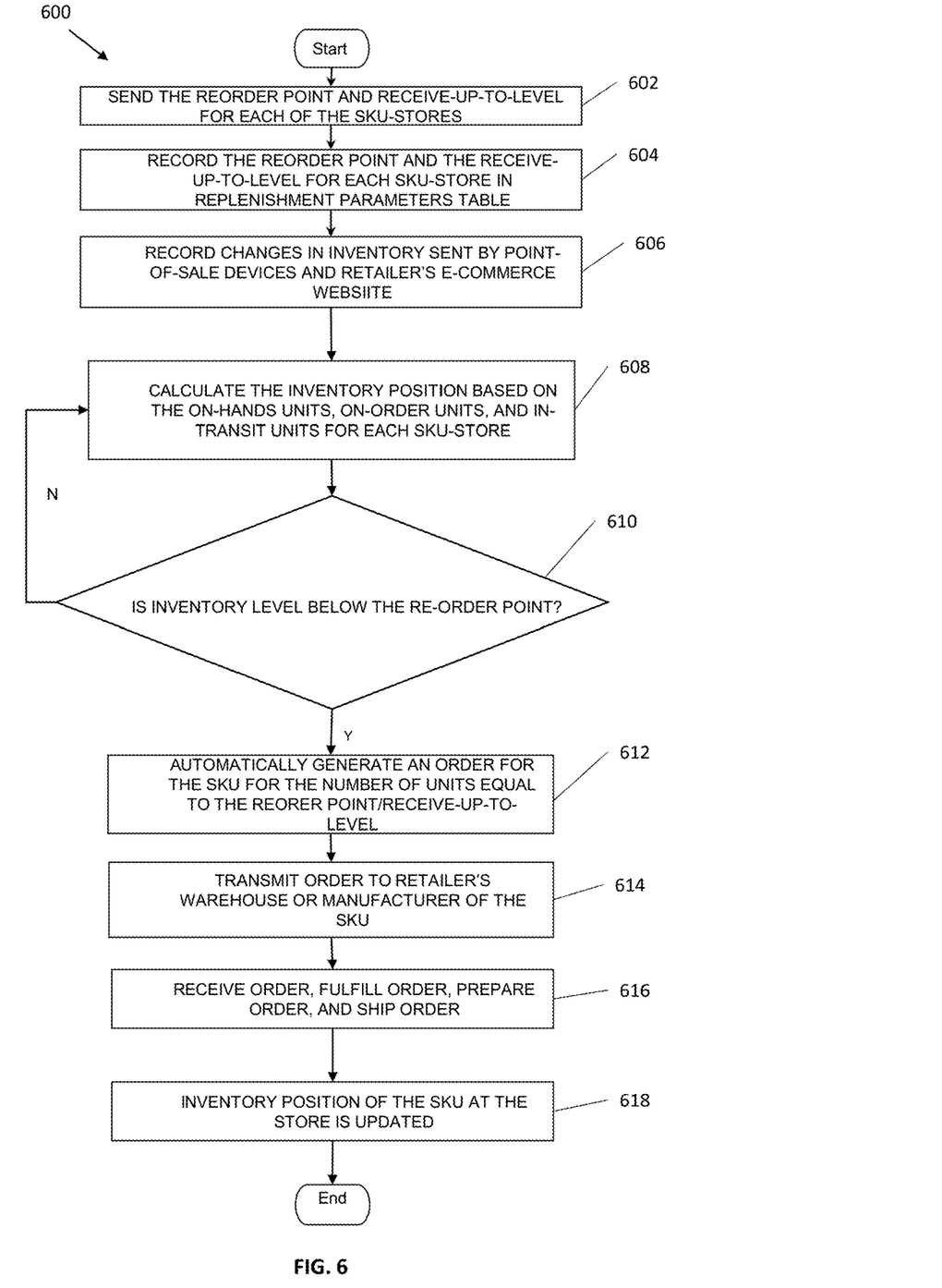
FIG. 6 illustrates an implementation embodiment of a 'self-tuning' replenishment optimization method that is used in an inventory optimization (IO) product.

In one embodiment, the replenishment optimization system drives the retailer's inventory management system and the order fulfillment operations at the suppliers (warehouse and/or manufacturer). With reference to FIG. 6, a computer-implemented method 600 is illustrated that describes an implementation embodiment for a 'self-tuning' replenishment optimization method that is used in an inventory optimization (IO) product. The method 600 is performed by at least a processor of a computer system that accesses and interacts with memories and/or data storage devices. For example, the processor at least accesses and reads/writes data to the memory and processes network communications to perform the actions of FIG. 6.

With continued reference to FIG. 6, the replenishment optimization system may evaluate thousands or millions of rows of data from historical sales, inventory position, product attributes, and supplier attributes for each SKU-store. The historical data may be accessed on a cloud-based system and is mined on a daily (sometimes intraday) basis to determine the optimal replenishment policy (the Reorder Point and Receive-Up-To-Level) based on the most recent patterns of the demand and supply side. The details of how the two parameters are calculated daily, as discussed above.

At 602, the method 600 is initiated when the replenishment optimization system sends the Reorder Point and Receive-Up-To-Level for each of the tens of thousands of SKU-stores to the retailer's inventory management software through a web-service call and in the form of a data structure. This data structure includes an initial Reorder Point and Receive-Up-To-Level for each of the tens of thousands of SKU-stores. The replenishment optimization system sends this information automatically each day or any other pre-determined time period. This is similar to step 202 discussed above. In particular, in this step the initial replenishment policies have been determined and the sales related to the initial replenishment policies are determined.

At 604, at some predetermined time period such as each day, the retailer's inventory management software records the Reorder Point and Receive-Up-To-Level for each SKU-store in a database table called the Replenishment Parameters table.

At 606, the inventory-management software also records changes in inventory sent to it by point-of-sale devices and also by the retailer's e-commerce website.

At 608, on a regular schedule that is set by the retailer per SKU-store, the inventory-management software compares the resulting inventory position for each SKU-store to the Reorder Point of the SKU-store. An inventory position is calculated based on the for example, on-hand units, on-order units, and in-transit units for each SKU-store. Steps 604, 606 and 608 are similar to step 204 and 206 discussed above. In particular, when the system determines that the stock-out rate falls below a certain threshold for a particular item, then the initial replenishment policy of the item is revised so that the stock-out rate of that item falls within the desired threshold, as discussed above. The final replenishment policy for that item is then generated to include a new reorder point and, if needed, a new receive-up-to-level of the item which is similar to step 208.

At 610, if the inventory level is below the Reorder Point set for the store, the software automatically generates in real-time an order for the SKU for the number of units equal to the Reorder Point and/or the Receive-Up-To-Level—Inventory Position (step 612). This is similar to step 209 discussed above. Again, the order refers to the request that is sent by the system to the fulfillment center to request that the fulfillment center ship a certain number of units of the item to a particular store so that the store's final reorder point and current inventory or on-hand stock level for the item are returned to their desired final reorder point and final receive-up-to-level.

At 614, depending on the SKU, the order may be sent to one of the retailer's warehouses, or it may be sent to the manufacturer of the SKU.

At 616, if the order is sent to one of the retailer's warehouses (or fulfillment center), warehouse-management software receives the order, and systems at the warehouse fulfill the order by packaging the units and preparing them for shipping. In one embodiment, the systems are controlled at least in part by the instructions in the order. The systems may include, for example, automated robotic mechanisms configured to locate and retrieve items from warehouse locations based on the order and/or rearrange items based on the order (e.g., add selected items, remove selected items, based on the final replenishment policy). The retrieved items are delivered by the robotic mechanism to automated packaging mechanisms that package the retrieved items.

In one embodiment, the robotic mechanisms may include one or more robots configured to navigate throughout a given warehouse, locate and retrieve items, and carry items to a destination. Each robot may include at least a body structure, a power source, a control interface, a wired/wireless communication interface, a drive device to move the robot, a navigation device, one or more sensors, and/or a balance device. Of course, the robot may be configured in different ways and multiple different types of robots may be operating together in the robotic mechanism of the warehouse.

In one or more embodiments, the robotic mechanisms may include one or more of the following systems. Automated Guided Vehicles (AGVs) for transporting materials, supplies, and inventory within warehouse facilities. An AGV may be configured to autonomously navigate warehouse facilities by following defined routes marked by wires, magnetic strips, tracks, sensors embedded in the floor or other physical guides. The AGV may also be navigated by a defined map of the warehouse based on a coordinate system and a tracked location of the AGV. Cameras may also be used to navigate an AGV. Another robotic mechanism is Automated Storage and Retrieval Systems (AS/RS) which may include a group of computer-controlled systems that automate inventory management and store/retrieve goods on demand from storage locations. The AS/RC may operate either as cranes or shuttles on fixed tracks and can traverse product aisles and vertical heights to remove items or drop off items from storage. Another robotic mechanism is articulated robotic arms that are a type of pick-and-place robot. These arms can move, turn, grab/release, lift and move items with, for example, multi-jointed limbs used to manipulate products.

After the retrieved items are transported to a packaging area, the items for the order are packaged by an automated system. This may include cartonization software that determines quantity, size, and type of container required to package of the order, and/or bagging machines that help speed up packaging operations.

The packaged order is transferred to a shipper, or if the retailer has its own shipment operation, then the retailer's own trucks will take the shipment. The status of the order is changed to "in transit" in the inventory-management system. The order arrives at the store it is destined for. Finally, at 618, the Inventory-management software then updates the inventory position of the SKU at the store. Steps 614 and 616 are similar to step 210 discussed above.

On the other hand, at 616, if the order is sent to a manufacturer, then the sequence of steps is similar except that the manufacturer is responsible for acting as a fulfillment center and fulfilling the order.

With the Reorder Point and Receive-Up-To-Level set properly through this system, the retailer can maintain the same service level while holding less inventory in each store, thus decreasing inventory-holding costs for each store which is another practical application.

Sample of Results from Simulated Data

Figure 7:
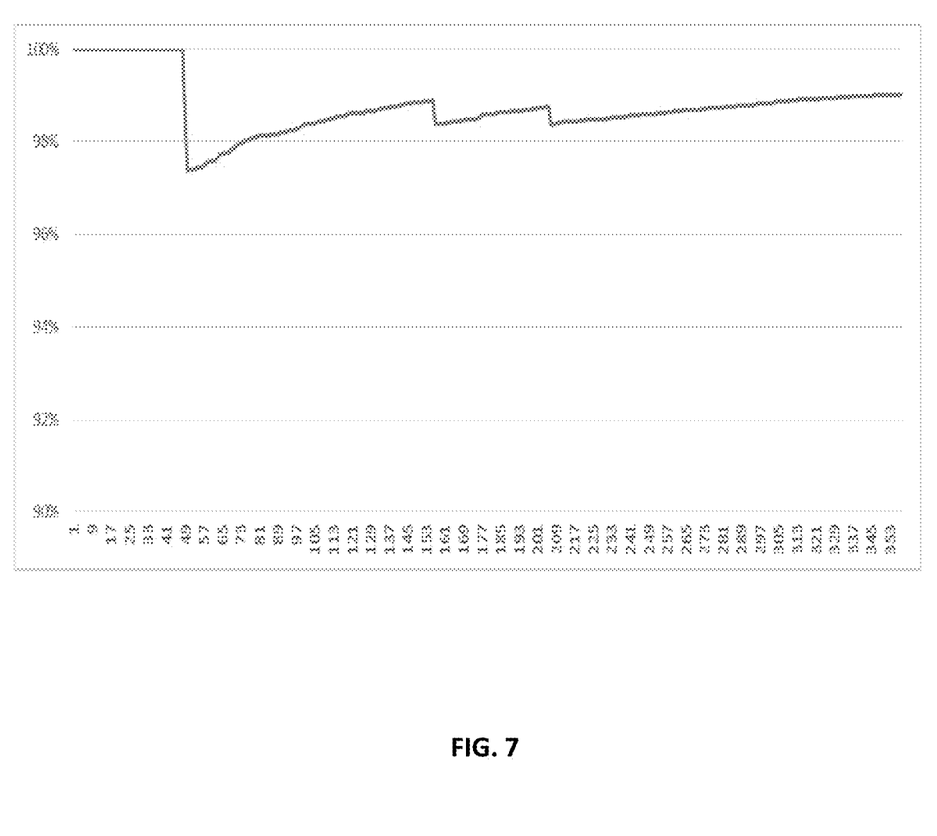
FIG. 7 is a graphical illustration that shows how the service level changes and converges to the target service level (99%) over time.
Figure 8:
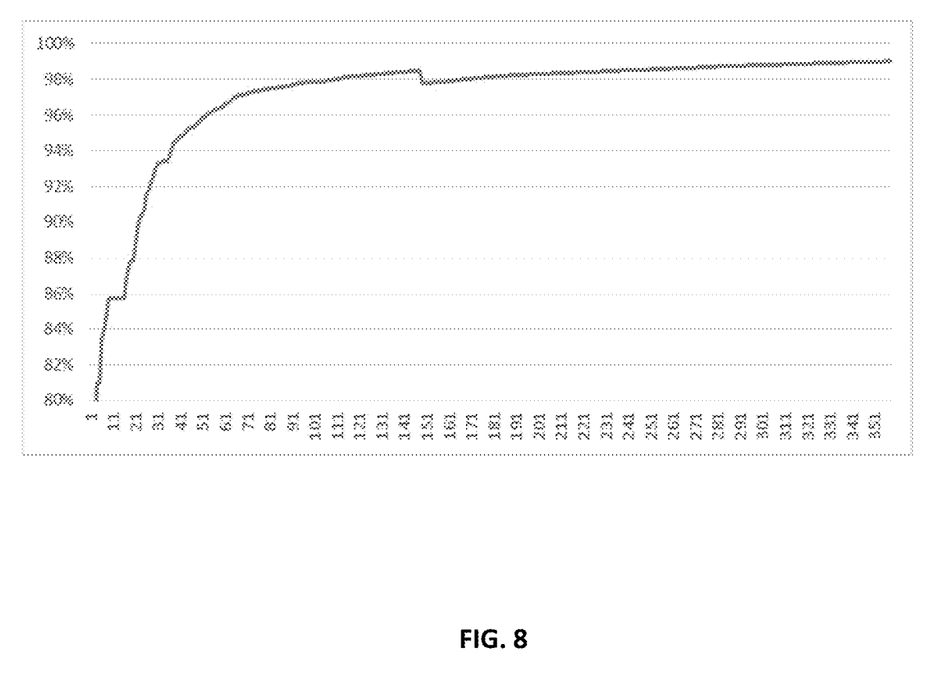
FIG. 8 is another graphical illustration that shows how the service level changes and converges to the target service level (99%) over time.

The graphical plots of FIGS. 7 and 8 show how the service level changes and converges to the target service level (99%) over time. The x-axis in each plot shows the number of periods (e.g., day number) and the y-axis shows the overall service level up-to that point.

As shown in FIG. 7, the initialized parameters lead to over-stock so the parameters are adjusted such that inventory level is decreased and service level gets closer to 99%. As shown in FIG. 8, initial RP and RUTL were under estimated so it took some periods to adjust and bring the service level closer to the target service level. The forecast error also plays a role in causing the parameters taking longer to adjust.

Cloud or Enterprise Embodiments

In one embodiment, the present system is a computing/data processing system including an application or collection of distributed applications for enterprise organizations. The applications and computing system may be configured to operate with or be implemented as a cloud-based networking system, a software as a service (SaaS) architecture, or other type of networked computing solution. In one embodiment the present system is a centralized server-side application that provides at least a graphical user interface including one or more of the functions disclosed herein and that is accessed by many users via computing devices/terminals communicating with the present computing system (functioning as the server) over a computer network.

In one embodiment, one or more of the components described herein are configured as program modules stored in a non-transitory computer readable medium and/or in computer memory. The program modules are configured with stored instructions that when executed by at least a processor cause the computing device to perform the corresponding function(s) as described herein.

Computing Device Embodiment

Figure 9:
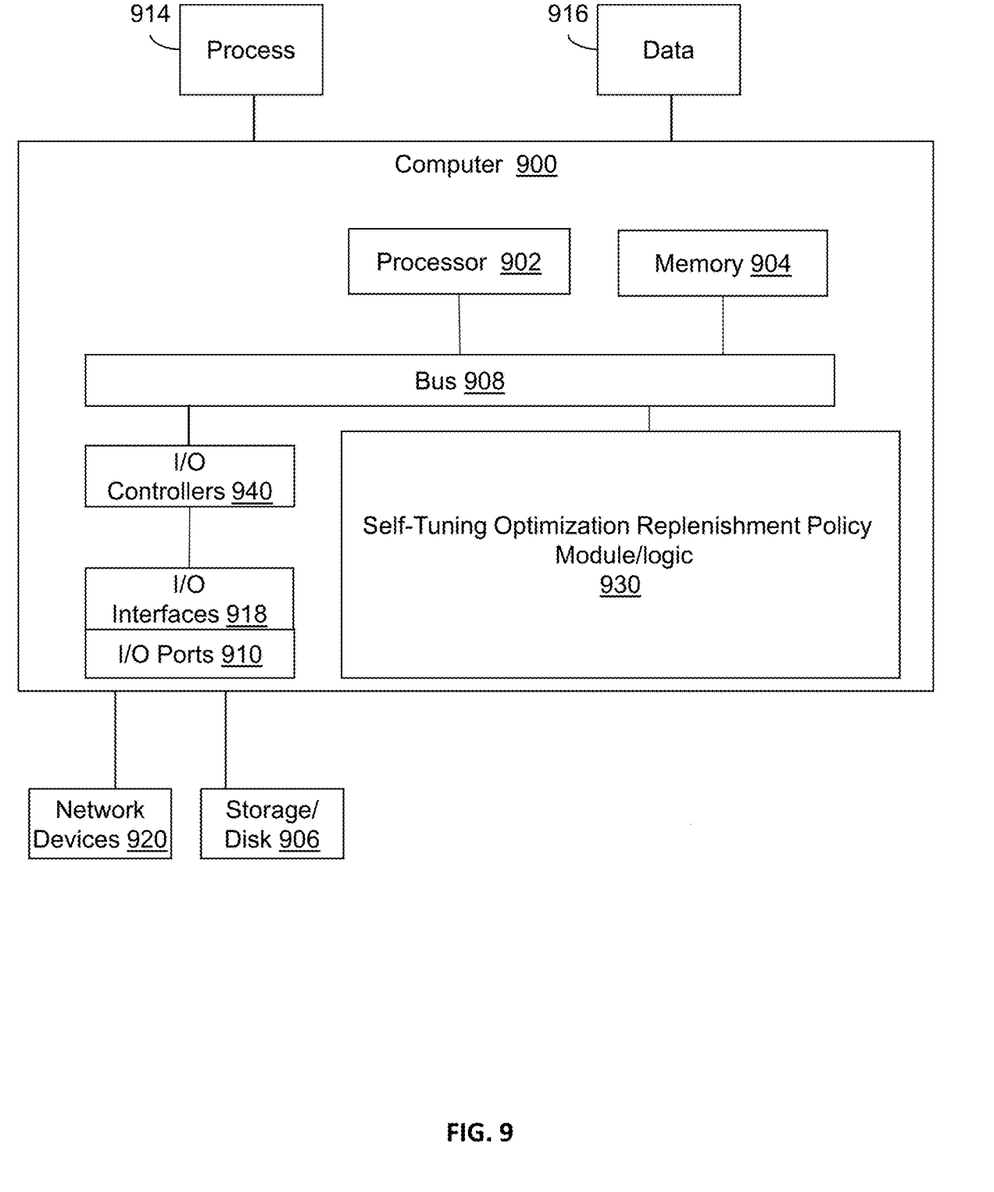
FIG. 9 illustrates an embodiment of a special purpose computing system configured with the example systems and/or methods disclosed.

FIG. 9 illustrates an example special purpose computing device that is configured and/or programmed with one or more of the example systems and methods described herein, and/or equivalents. The example computing device may be a computer 900 that includes a processor 902, a memory 904, and input/output ports 910 operably connected by a bus 908. In one example, the computer 900 may include a self-tuning optimization replenishment policy module/logic 930 configured to facilitate self-tuning optimization of an item replenishment policy, as performed by the method of FIGS. 2-6. In different examples, the logic 930 may be implemented in hardware, a non-transitory computer-readable medium with stored instructions, firmware, and/or combinations thereof. While the logic 930 is illustrated as a hardware component attached to the bus 908, it is to be appreciated that in other embodiments, the logic 930 could be implemented in the processor 902, stored in memory 904, or stored in disk 906.

In one embodiment, logic 930 or the computer is a means (e.g., structure: hardware, non-transitory computer-readable medium, firmware) for performing the actions described. In some embodiments, the computing device may be a special purpose server operating in a Cloud computing system, a server configured in a Software as a Service (SaaS) architecture, a smart phone, laptop, tablet computing device, and so on.

Describing an example configuration of the computer 900, the processor 902 may be a variety of various specially programmed processors including dual microprocessor and other multi-processor architectures. A memory 904 may include volatile memory and/or non-volatile memory. Non-volatile memory may include, for example, ROM, PROM, and so on. Volatile memory may include, for example, RAM, SRAM, DRAM, and so on.

A storage disk 906 may be operably connected to the computer 900 via, for example, an I/O controller 940, an input/output (I/O) interface (e.g., card, device) 918 and an input/output port 910. The disk 906 may be, for example, a magnetic disk drive, a solid-state disk drive, a floppy disk drive, a tape drive, a Zip drive, a flash memory card, a memory stick, and so on. Furthermore, the disk 906 may be a CD-ROM drive, a CD-R drive, a CD-RW drive, a DVD ROM, and so on. The memory 904 can store a process 914 and/or a data 916, for example. The disk 906 and/or the memory 904 can store an operating system that controls and allocates resources of the computer 900.

The computer 900 may interact with input/output (I/O) devices via the I/O controller 940, the I/O interfaces 918, and the input/output ports 910. Input/output devices may be, for example, a keyboard, a microphone, a pointing and selection device, cameras, video cards, displays, the disk 906, the network devices 920, and so on. The input/output ports 910 may include, for example, serial ports, parallel ports, and USB ports.

The computer 900 can operate in a network environment and thus may be connected to the network devices 920 via the I/O controller 940, the I/O interfaces 918, and/or the I/O ports 910. Through the network devices 920, the computer 900 may interact with a network. Through the network, the computer 900 may be logically connected to remote computers. Networks with which the computer 900 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a Cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101. It is inconsistent with the present disclosure to interpret that any of the functions performed and/or claimed herein can be performed in the human mind or manually.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor specially programmed with an algorithm for performing the disclosed methods, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method for self-tuning optimization of an item replenishment policy, wherein the method comprises:

determining an initial item replenishment policy of an item, wherein the initial item replenishment policy of the item includes an initial service level of the item;

determining a target service level of the item, wherein the target service level is a percentage in relation to a predetermined threshold stock-out rate;

determining a performance of the initial item replenishment policy based upon a performance of the initial item replenishment policy in past sales periods by periodically determining an estimated stock-out rate of the item;

upon determining that the estimated stock-out rate falls below the predetermined threshold stock-out rate, adjusting the initial service level to create a revised service level of the item;

comparing the revised service level and the target service level to determine if a difference between the revised service level and the target service level falls within a pre-determined limit;

upon determining that the difference between the revised service level and the target service level does not fall within the pre-determined limit, iteratively adjusting the revised service level until the difference between the revised service level and the target service level reaches the pre-determined limit;

upon determining that the difference between the revised service level and the target service level reaches the pre-determined limit, generating in real-time a final item replenishment policy which includes a final service level data structure;

transmitting an order to an item fulfillment facility so that the item fulfillment facility has access to up-to-date information about the final item replenishment policy and to cause the item fulfillment facility to fulfill the order, wherein the order includes the final service level data structure;

upon receiving the order at the item fulfillment facility, automatically operating a robotic mechanism by initiating a signal that causes the robotic mechanism to locate and retrieve the item at the item fulfillment facility based upon the order for subsequent shipping of the item from the item fulfillment facility;

initiating a signal to cause an automated packaging mechanism to package the retrieved item based upon the order; and transporting the packaged item to a store by one or more machines in accordance with the final service level data structure.

2. The computer-implemented method of claim 1, wherein the method further comprises: determining if a difference between a current amount of the item and a final re-order amount of the item has fallen below a second pre-determined limit; and upon determining that the difference between the current amount of the item and the final re-order amount of the item has fallen below the second pre-determined limit, transmitting the order to the item fulfillment facility.

3. The computer-implemented method of claim 2, wherein the order is generated to further comprise: an amount of the item to be shipped in order to adjust the current amount of the item so that the difference between the current amount of the item and the final re-order amount of the item is within the second pre-determined limit.

4. The computer-implemented method of claim 1, wherein determining the initial item replenishment policy of the item comprises:
determining an initial re-order amount of the item; and
determining an initial receive-up-to amount of the item.

5. The computer-implemented method of claim 1, wherein determining the performance of the initial replenishment policy based upon the performance of the initial item replenishment policy in the past sales periods further comprises:
determining a back-cast ratio of the past sales periods; and
determining lost sales of the item over the past sales periods.

6. The computer-implemented method of claim 1, wherein adjusting the initial service level to create the revised service level of the item comprises:
adjusting a revised re-order amount of the item; and
adjusting a revised receive-up-to amount of the item.

7. The computer-implemented method of claim 2, wherein the final service level data structure is generated to comprise: the final re-order amount of the item; and a final receive-up-to amount of the item.

8. A non-transitory computer-readable medium storing computer-executable instructions that, when executed by a computer including a processor, cause the computer to perform functions configured by the computer-executable instructions, wherein the instructions comprise:
determine an initial item replenishment policy of an item, wherein the initial item replenishment policy of the item includes an initial service level of the item;
determine a target service level of the item, wherein the target service level is a percentage in relation to a predetermined threshold stock-out rate;
determine a performance of the initial item replenishment policy based upon a performance of the initial item replenishment policy in past sales periods by periodically determining an estimated stock-out rate of the item;
upon determining that the estimated stock-out rate falls below the predetermined threshold stock-out rate, adjust the initial service level to create a revised service level of the item;
compare the revised service level and the target service level to determine if a difference between the revised service level and the target service level falls within a pre-determined limit;
upon determining that the difference between the revised service level and the target service level does not fall within the pre-determined limit, iteratively adjust the revised service level until the difference between the revised service level and the target service level reaches the pre-determined limit;
upon determining that the difference between the revised service level and the target service level reaches the pre-determined limit, generate in real-time a final item replenishment policy which includes a final service level data structure;
transmit an order to an item fulfillment facility so that the item fulfillment facility has access to up-to-date information about the final item replenishment policy and the item fulfillment facility can fulfill the order, wherein the order includes the final service level data structure;
upon receiving the order at the item fulfillment facility, automatically operate a robotic mechanism by initiating a signal that causes the robotic mechanism to locate and retrieve the item at the item fulfillment facility based upon the order for subsequent shipping of the item from the item fulfillment facility;
initiate a signal to cause an automated packaging mechanism to package the retrieved item based upon the order; and
transport the item to a store by one or more machines in accordance with the final service level data structure.

9. The non-transitory computer-readable medium of claim 8, further comprising instructions that, when executed by at least the processor, cause the processor to:
determine if a difference between a current amount of the item and a final re-order amount of the item has fallen below a second pre-determined limit; and
upon determining that the difference between the current amount of the item and the final re-order amount of the item has fallen below the second pre-determined limit, transmit the order to the item fulfillment facility.

10. The non-transitory computer-readable medium of claim 9, wherein the order comprises:
an amount of the item to be shipped in order to adjust the current amount of the item so that the difference between the current amount of the item and the final re-order amount of the item is within the second pre-determined limit.

11. The non-transitory computer-readable medium of claim 8, further comprising instructions that, when executed by at least the processor, cause the processor to:
determine an initial re-order amount of the item; and
determine an initial receive-up-to amount of the item.

12. The non-transitory computer-readable medium of claim 8, further comprising instructions that, when executed by at least the processor, cause the processor to:
determine a back-cast ratio of the past sales periods; and
determine lost sales of the item over the past sales periods.

13. The non-transitory computer-readable medium of claim 9, wherein the final service level data structure comprises:
the final re-order amount of the item; and
a final receive-up-to amount of the item.

14. A computing system, comprising:
at least one processor connected to at least one memory comprising a non-transitory computer readable medium;
a self-tuning optimization replenishment policy control module stored on the memory and including instructions that, when executed by the at least one processor, cause the at least one processor to:
determine an initial item replenishment policy of an item, wherein the initial item replenishment policy of the item includes an initial service level of the item;
determine a target service level of the item, wherein the target service level is a percentage in relation to a predetermined threshold stock-out rate;
determine a performance of the initial item replenishment policy based upon a performance of the initial item replenishment policy in past sales periods by periodically determining an estimated stock-out rate of the item;

upon determining that the estimated stock-out rate falls below the predetermined threshold stock-out rate, adjust the initial service level to create a revised service level of the item;

compare the revised service level and the target service level to determine if a difference between the revised service level and the target service level falls within a pre-determined limit;

upon determining that the difference between the revised service level and the target service level does not fall within the pre-determined limit, iteratively adjust the revised service level until the difference between the revised service level and the target service level reaches the pre-determined limit;

upon determining that the difference between the revised service level and the target service level reaches the pre-determined limit, generate in real-time a final item replenishment policy which includes a final service level data structure;

transmit an order to an item fulfillment facility so that the item fulfillment facility has access to up-to-date information about the final item replenishment policy and the item fulfillment facility can fulfill the order, wherein the order includes the final service level data structure; and upon receiving the order at the item fulfillment facility, automatically operate a robotic mechanism by initiating a signal that causes the robotic mechanism to locate and retrieve the item at the item fulfillment facility based upon the order for subsequent shipping of the item from the item fulfillment facility;

initiate a signal to cause an automated packaging mechanism to package the retrieved item based upon the order; and initiate transport of the packaged item to a store in accordance with the final service level data structure.

15. The computing system of claim 14, wherein the self-tuning optimization replenishment policy control module further includes instructions that, when executed by the at least one processor, cause the at least one processor to:
determine if a difference between a current amount of the item and a final re-order amount of the item has fallen below a second pre-determined limit; and
upon determining that the difference between the current amount of the item and the final re-order amount of the item has fallen below the second pre-determined limit, transmit the order to the item fulfillment facility.

16. The computing system of claim 15, wherein the order comprises:
an amount of the item to be shipped in order to adjust the current amount of the item so that the difference between the current amount of the item and the final re-order amount of the item is within the second pre-determined limit.

17. The computing system of claim 14, wherein the self-tuning optimization replenishment policy control module further includes instructions that, when executed by the at least one processor, cause the at least one processor to:
determine an initial re-order amount of the item; and
determine an initial receive-up-to amount of the item.

18. The computing system of claim 14, wherein the self-tuning optimization replenishment policy control module further includes instructions that, when executed by the at least one processor, cause the at least one processor to:
determine a back-cast ratio of the past sales periods; and
determine lost sales of the item over the past sales periods.

* * * * *

UNITED STATES PATENT AND TRADEMARK OFFICE
CERTIFICATE OF CORRECTION

| | | |
|---|---|---|
| PATENT NO. | : 11,727,348 B2 | Page 1 of 1 |
| APPLICATION NO. | : 16/952468 | |
| DATED | : August 15, 2023 | |
| INVENTOR(S) | : Borjian Boroujeni et al. | |

It is certified that error appears in the above-identified patent and that said Letters Patent is hereby corrected as shown below:

On the Title Page

On page 2, Column 2, item (56) under Other Publications, Line 1, delete ""Anew" and insert -- "A new --, therefor In the Drawings On sheet 2 of 9, in FIG. 2, under Reference Numeral 208, Line 1, delete "RELENISHMENT POLICCY" and insert -- REPLENISHMENT POLICY --, therefor.

On sheet 5 of 9, in FIG. 5, under Reference Numeral 502, Line 1, delete "ADJSUTED" and insert -- ADJUSTED --, therefor.

On sheet 6 of 9, in FIG. 6, and on the title page, the illustrative print figure, under Reference Numeral 606, Line 3, delete "WEBSIITE" and insert -- WEBSITE --, therefor.

On sheet 6 of 9, in FIG. 6, and on the title page, the illustrative print figure, under Reference Numeral 612, Line 3, delete "REORER" and insert -- REORDER --, therefor.

Signed and Sealed this
Twenty-ninth Day of July, 2025

Coke Morgan Stewart
*Acting Director of the United States Patent and Trademark Office*